US009272558B2

(12) United States Patent
Maher

(10) Patent No.: US 9,272,558 B2
(45) Date of Patent: Mar. 1, 2016

(54) DOOR MANUFACTURING SYSTEM AND METHOD

(75) Inventor: Kenneth Brelsford Maher, Chevy Chase, MD (US)

(73) Assignee: Frenchporte, LLC, Silver Spring, MD (US)

(*) Notice: Subject to any disclaimer, the term of this patent is extended or adjusted under 35 U.S.C. 154(b) by 514 days.

(21) Appl. No.: 12/560,854

(22) Filed: Sep. 16, 2009

(65) Prior Publication Data

US 2010/0218424 A1 Sep. 2, 2010

Related U.S. Application Data

(60) Provisional application No. 61/202,438, filed on Feb. 27, 2009.

(51) Int. Cl.
*B41M 5/00* (2006.01)
*B44C 5/04* (2006.01)
*E06B 3/70* (2006.01)

(52) U.S. Cl.
CPC .......... *B41M 5/0058* (2013.01); *B41M 5/0047* (2013.01); *B44C 5/04* (2013.01); *B41M 5/0088* (2013.01); *E06B 3/7001* (2013.01); *G05B 2219/45186* (2013.01)

(58) Field of Classification Search
USPC .............. 347/101, 102, 105; 101/43, 44, 485, 101/DIG. 30; 160/201, 229.1
IPC ...................................................... B41M 5/0058
See application file for complete search history.

(56) References Cited

U.S. PATENT DOCUMENTS 5,570,292 A 10/1996 Abraham et al.
5,757,389 A * 5/1998 Schwede et al. .................. 347/4
(Continued)

FOREIGN PATENT DOCUMENTS

DE 19513476 A1 10/1996
DE 102006027538 A1 12/2007
(Continued)

OTHER PUBLICATIONS

International Search Report dated Oct. 12, 2010 (1 page).

*Primary Examiner* — David Purol
(74) *Attorney, Agent, or Firm* — Pixton Law Group; Evan R. Smith

(57) ABSTRACT

A system and method of a manufacturing an overhead garage door, includes methods, processes and/or actions for using a printing technique in the assembly line, as well as door sections, doors and printing machines. A method of manufacturing a door includes dividing a first digital image into a number of parallel sections to form multiple section images; printing with ink each of the section image on a separate paint metal door segment, and assembling the door segments so as to create an assembled door having the appearance of the first digital image. A method of manufacturing a door includes a step of applying a clearing coating material to each of the door segments. There is provided a sectional garage door that includes a first door section; and an electronic component coupled to the first door section for associating with an electronic image. A sectional door includes an image printed thereon and the electronic image being the printed on the door section. A method of manufacturing a door includes electronically detecting a door section; and responsive to the step of detecting, selecting a digital image to be printed on the door section. A sectional door may have an ink surface thereon.

18 Claims, 17 Drawing Sheets

(56) References Cited

U.S. PATENT DOCUMENTS

| | | | |
|---|---|---|---|
| 6,309,503 B1* | 10/2001 | Martino | 156/277 |
| 6,523,921 B2* | 2/2003 | Codos | 347/8 |
| 6,547,384 B2 | 4/2003 | Hayashi | |
| 6,918,643 B2 | 7/2005 | Kwag et al. | |
| 6,954,676 B2 | 10/2005 | Dorsch | |
| 7,001,016 B2* | 2/2006 | Baxter et al. | 347/101 |
| 7,032,519 B2* | 4/2006 | Luxem et al. | 101/485 |
| 7,140,711 B2 | 11/2006 | Nerad et al. | |
| 7,168,803 B2 | 1/2007 | Baxter et al. | |
| 7,230,629 B2* | 6/2007 | Reynolds et al. | 345/589 |
| 7,438,407 B2 | 10/2008 | Coghlan et al. | |
| 7,520,217 B2 | 4/2009 | Roberts et al. | |
| 2003/0213567 A1 | 11/2003 | Markley | |
| 2005/0055921 A1* | 3/2005 | Vella | 52/311.1 |
| 2005/0076591 A1* | 4/2005 | Koeller | 52/311.1 |
| 2005/0194106 A1* | 9/2005 | Scales | 160/201 |
| 2006/0086275 A1* | 4/2006 | Fermandez et al. | 101/485 |
| 2007/0103529 A1 | 5/2007 | Pearl et al. | |
| 2007/0245661 A1* | 10/2007 | Daniels | 52/455 |
| 2008/0192075 A1 | 8/2008 | Campion et al. | |
| 2010/0269414 A1* | 10/2010 | Horton | 49/197 |

FOREIGN PATENT DOCUMENTS

| | | |
|---|---|---|
| JP | 2004050520 A | 2/2004 |
| KR | 100774081 B1 | 11/2007 |
| WO | 0222362 A2 | 3/2002 |

* cited by examiner

DOOR MANUFACTURING SYSTEM AND METHOD

CROSS REFERENCE TO RELATED APPLICATIONS

The present application claims priority to U.S. Provisional Application No. 61/202,438 filed on Feb. 27, 2009, the contents therein are incorporated by reference herein.

FIELD

The present invention generally relates to doors, and in particular to a system and method of a manufacturing an overhead garage door.

BACKGROUND

Garage doors are generally known in the art as structures that form a movable barrier in an entryway to a garage or other type of building. Conventional overhead garage doors are formed from a vertical stack of horizontally folding sections interconnected by hinges and supported by a guide track.

Visible seams are created in these conventional doors where the horizontal panels of the door meet when in the closed, vertical position. These seams detract from the aesthetics of the door and may allow moisture, wind and debris to penetrate through the garage door. Repeated use of the door over extended periods may cause these seams to widen further, allowing more moisture, wind and debris into the garage, reducing the insulation capabilities of the door and further detracting from the aesthetics of the door.

The conventional manufacture of a garage door involves numerous personnel-hours and equipment operating time. The relatively heavy weights, the number of assembly steps, and the large size of the door panel can result in a slow, labor-intensive operation. These problems result in reduced ability to meet customer demands for the products. The labor-intensive nature in which the conventional doors are made results in high manufacturing costs which is not efficient. Further, these conventional production practices increase production error and inconsistent product quality.

BRIEF SUMMARY

Aspects of the present invention pertain to a system and method of a manufacturing an overhead garage door, including methods, processes and/or actions for using a printing technique in the assembly line, as well as door sections, doors and printing machines.

According to one aspect, a method of manufacturing a door includes dividing a first digital image into a number of parallel sections to form multiple section images; printing with ink each of the section image on a separate painted metal door segment, and assembling the door segments so as to create an assembled door having the appearance of the first digital image.

In another aspect, a method of manufacturing a door includes a step of applying ultraviolet light to the ink after the step of printing. In yet another aspect, a method of manufacturing a door includes a step of applying a clearing coating material to each of the door segments.

One end result includes a printed garage door section/segment that may have a decorative design of a digitalized picture, such as a digital drawing or an actual picture or photograph or a combination of both, printed on the exposed surface of the door section/segment.

According to one aspect, there is provided a sectional garage door that includes a first door section; and an electronic component coupled to the first door section for associating with an electronic image. In one aspect, the electronic component is a radio frequency identification component.

According to another aspect, a sectional door may have an ink surface thereon. According to another aspect, a sectional door includes an image printed thereon and the electronic image being printed on the door section. According to one aspect, a sectional door includes a printed image of a French door. According to one aspect, a sectional door includes a printed image of a carriage house door.

According to another aspect, a method of manufacturing a door includes electronically detecting a door section; and responsive to the step of detecting, selecting a digital image to be printed on the door section.

According to another aspect, a system may be configured to produce one or more sections of an overhead door having an image or multiple images which visually connect to each other to form a larger image. In one method, the process begins from a first image, divides the first image into a number of sections to form multiple section images, and prints each of the section images on a separate door segment, and assembles the door segments so as to create a finished door having the collective appearance of the first image.

BRIEF DESCRIPTION OF THE DRAWINGS

The foregoing summary of the invention as well as the following detailed description of the invention, considered in conjunction with the accompanying drawings, provides a better understanding of the invention, in which like reference numbers refer to like elements, and wherein.

DETAILED DESCRIPTION

FIGS. 1-17 illustrate an embodiment of a system 100 and method for producing an overhead garage door. The inventive door forming system 100 and the improved method have several features that produce synergistic effects, such as improved product yield by reducing waste, reduced manufacturing costs by reducing labor overhead, and/or improved time to the market of a garage door by speeding manufacturing time. The inventive operation of system 100 has several advantageous features including reducing errors, allowing for product customization, and thus produces a consistent product without significant variations in product quality.

In one construction, door forming system 100 is configured to produce one or more sections of an overhead door having an image or multiple images which visually connect to each other to form a larger image. In one method, the process starts from a first image, divides the first image into a number of parallel sections to form multiple section images, prints each of the section images on a separate door segment, and assembles the door sections so as to create a finished door having the appearance of the first image. Purely by way of example, an overhead garage door 10 depicted in FIG. 1 includes decorative façade elements 12 that simulate a set of four light-transmitting doors known commonly as French doors. A set of French doors typically includes two doors each having an array of divided lights. In the garage door 10, the windows printed light-transmitting panels that simulate the visual appearance of light panels.

Figure 1:
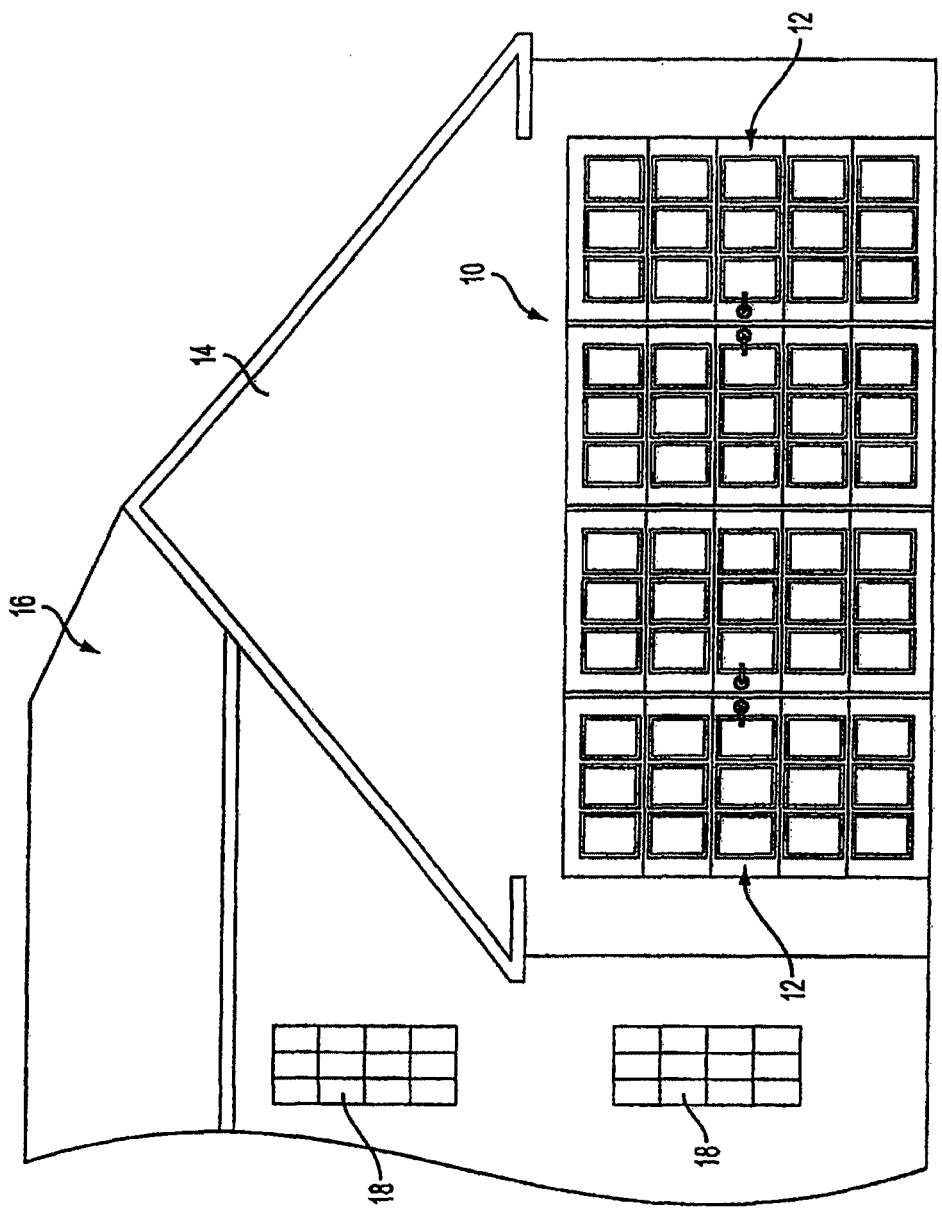
FIG. 1 shows a portion of a house with an attached garage having an embodiment of an overhead garage door in accordance with the present invention.
Figure 2:
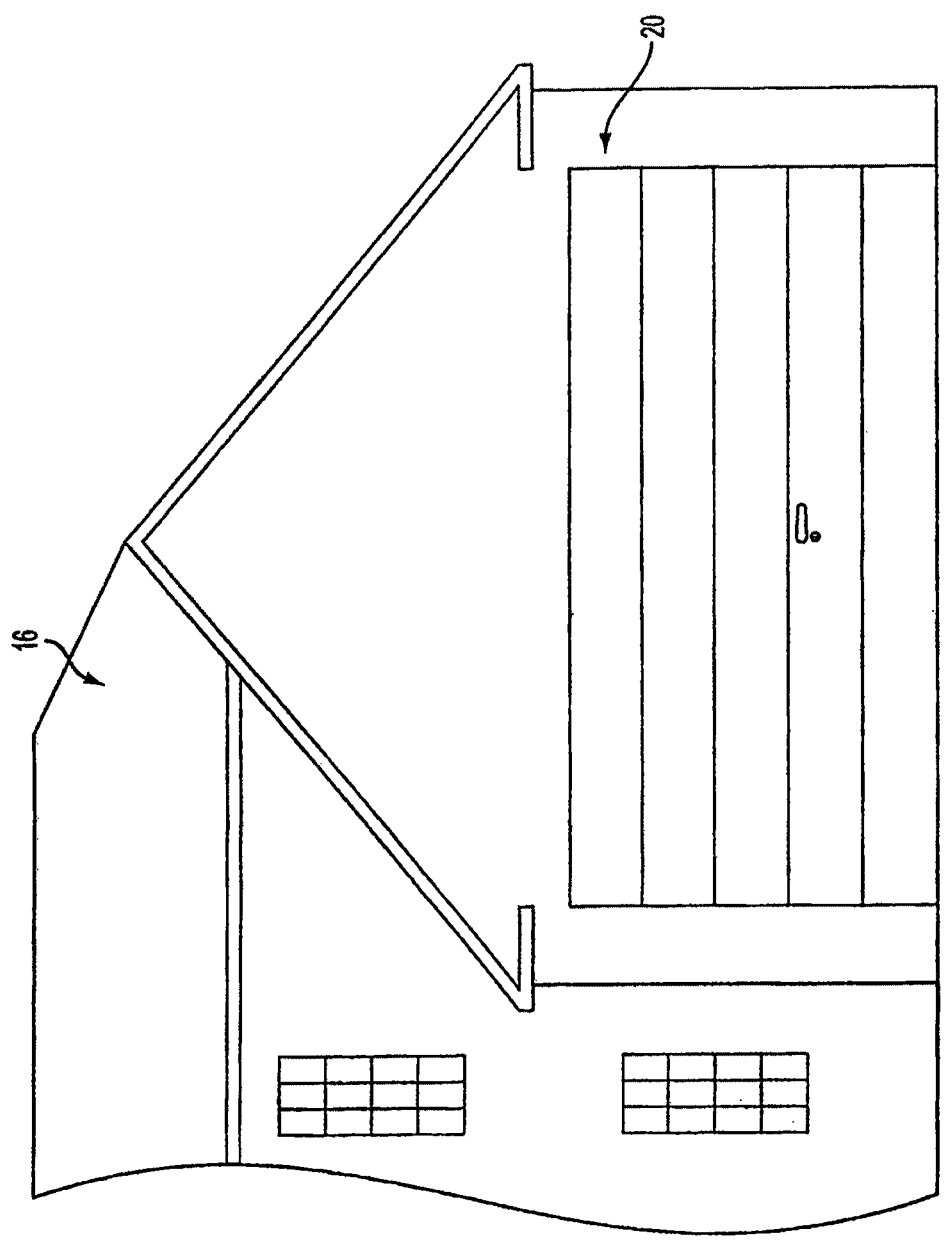
FIG. 2 shows the house of FIG. 1, but with a conventional overhead garage door.

The garage door 10 is shown installed on a garage 14 of a conventional house 16. For illustration purposes, the house includes divided light windows 18. The façade elements 12 give the garage door 10 an attractive appearance that blends well with the style of the house 16, particularly with the divided light windows 18 of the house. In contrast, FIG. 2 shows a conventional garage door installed on the same conventional house 16. Rather than blending in with the style of the house 16, the conventional garage door 20 stands out as a monolithic blank space that detracts from the appearance of the house.

Figure 3:
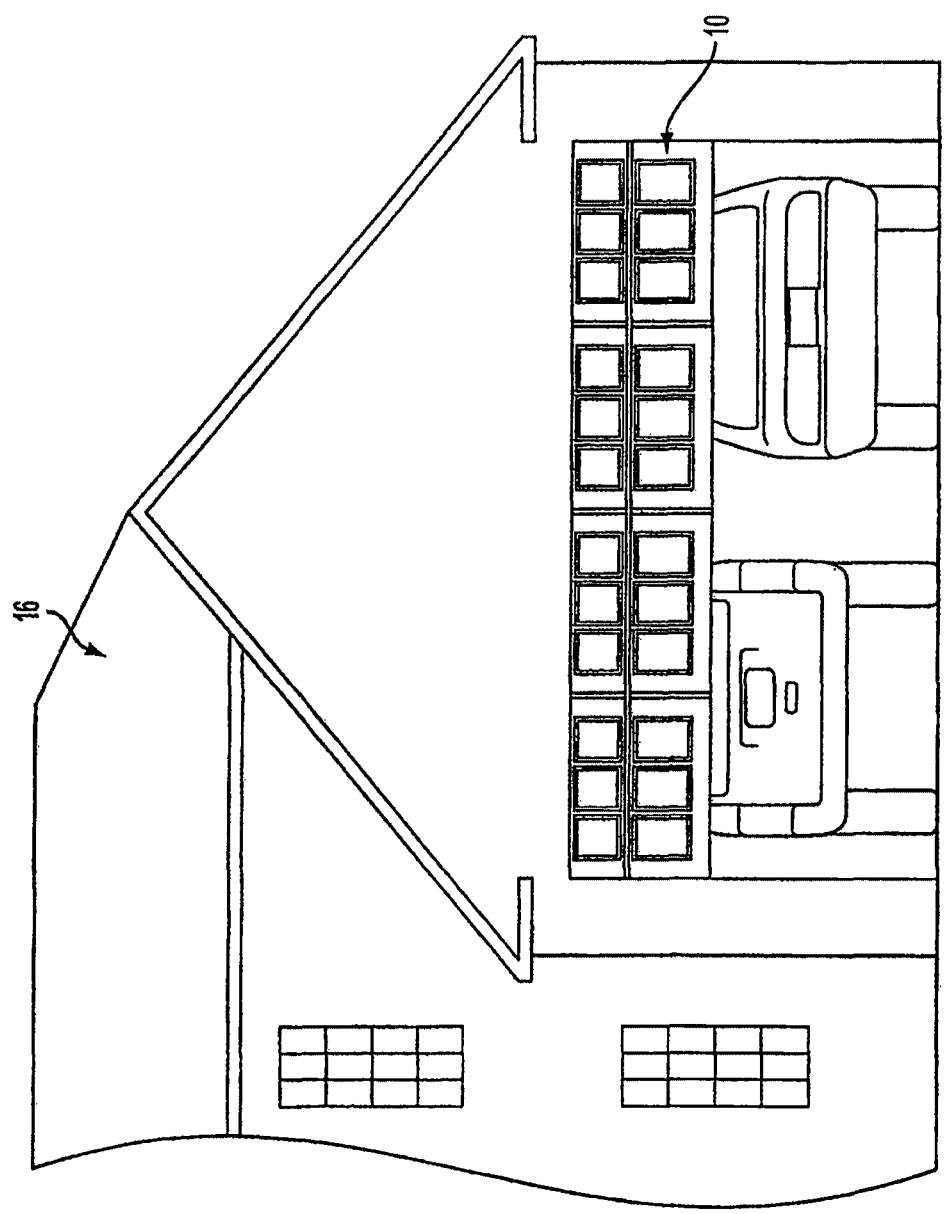
FIG. 3 shows the garage door of FIG. 1, but with the overhead garage door shown in a partially opened condition.
Figure 4:
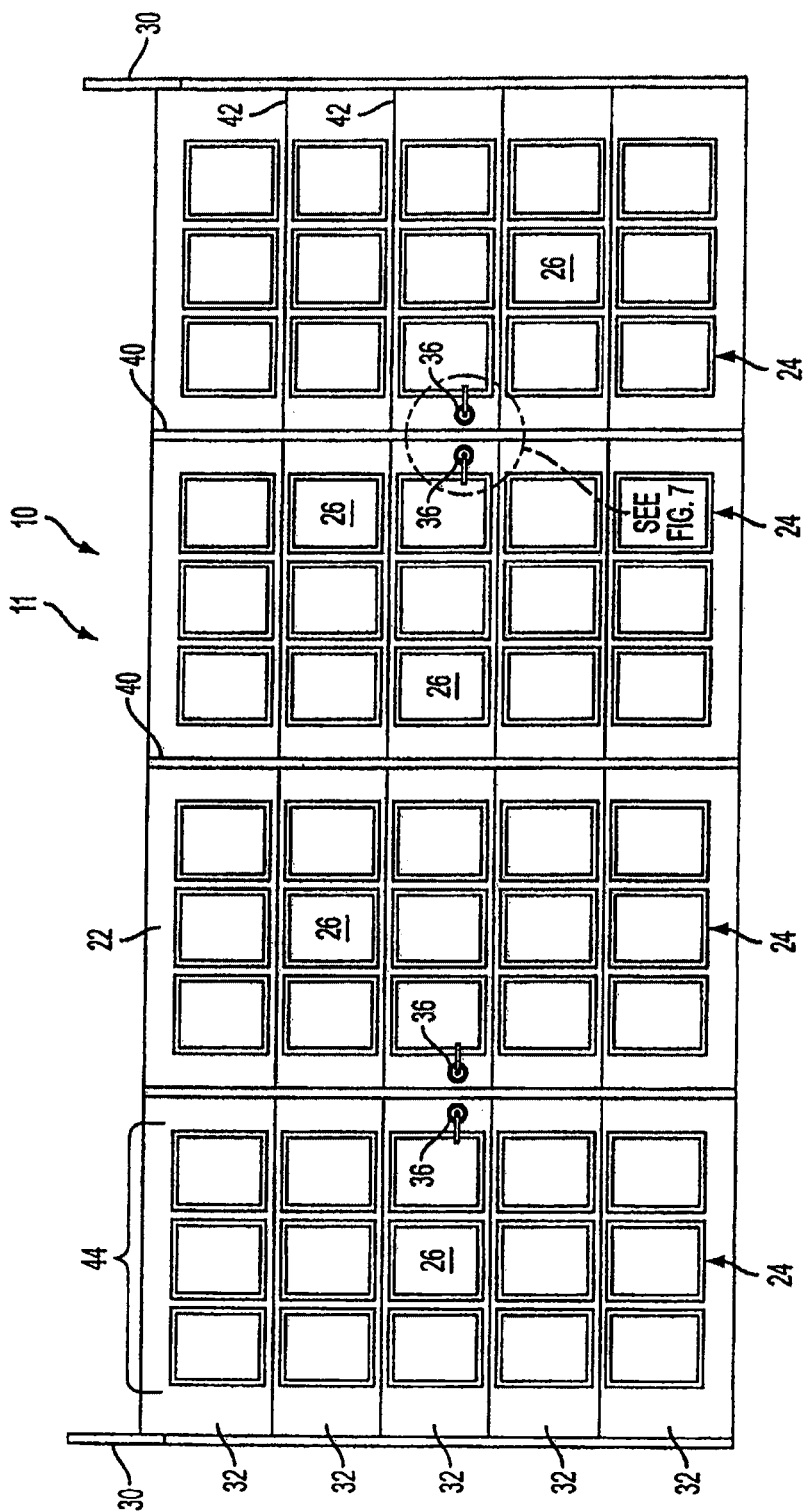
FIG. 4 is an exterior elevational view of the garage door of FIG. 1, including guide rails for connecting the door to the garage.
Figure 5:
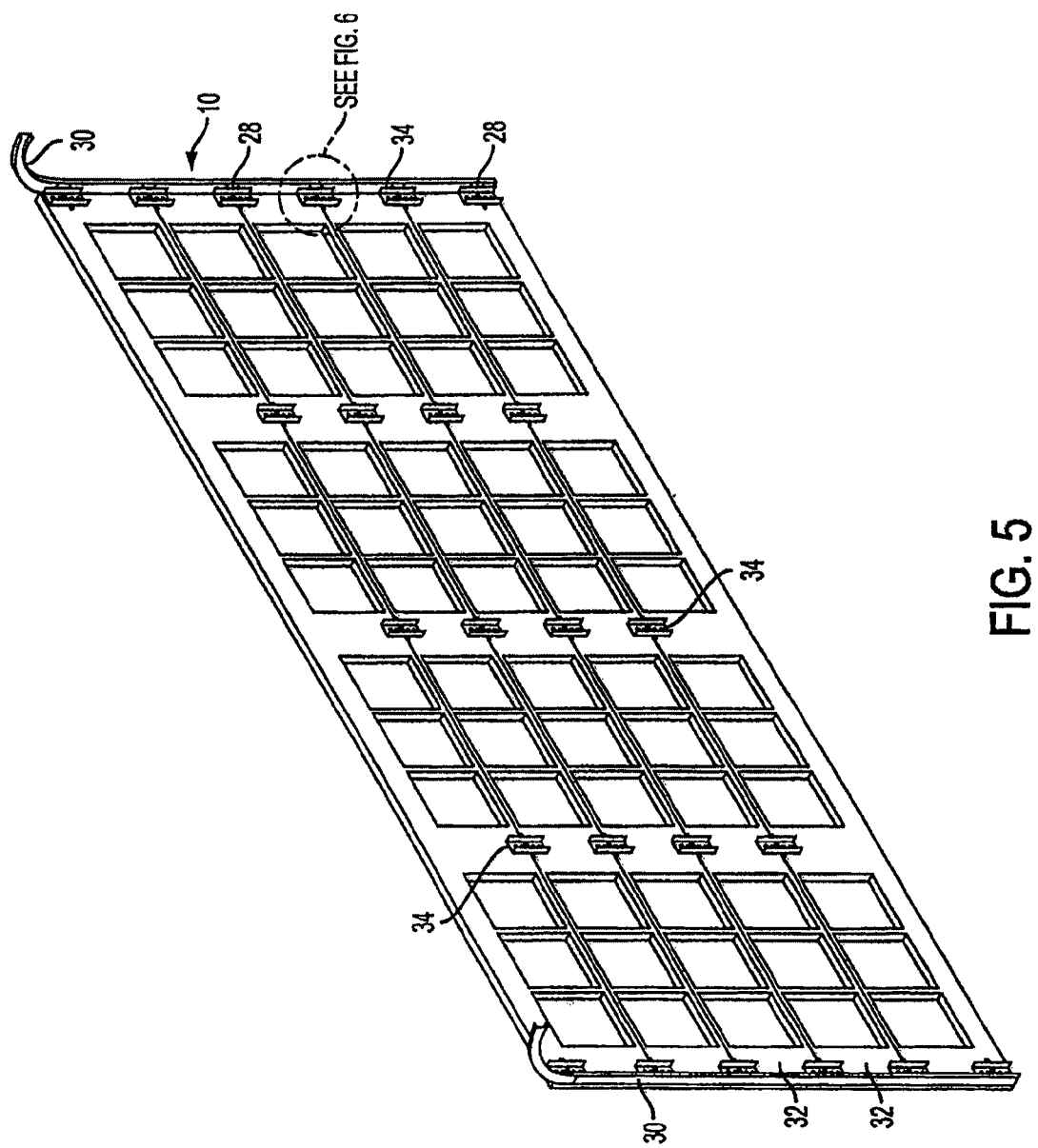
FIG. 5 shows an interior perspective view of the garage door of FIG. 4.

Referring now to FIGS. 4-7, the overhead garage door 10 includes a door 22, four arrays 24 of light-transmitting panels 26, guide rollers 28, and guide tracks 30. The door 22 includes sections 32 arranged in a stack, and hinges 34 pivotally connecting adjacent sections 32. Guide rollers 28 are connected to edge portions of the sections 32 and are retained in a guide track 30 attached to the garage. The track has a vertical section and a horizontal section and extends at a right angle from a vertical position to a horizontal position. The guide rollers 28 are each received in a channel 31 in one of the guide tracks 30. The garage door 12 opens and closes by rolling on the guide rollers along the guide tracks 30 from a vertical closed position to an overhead horizontal open position, and vice versa, as is known in the art. To illustrate, FIG. 3 shows garage door 10 in a position intermediate between the opened and closed position. Although embodied herein as a sectioned garage door, the present invention works as well with unitary, slab-type overhead garage doors as are known in the art, or with other types of overhead garage doors.

Figure 6:
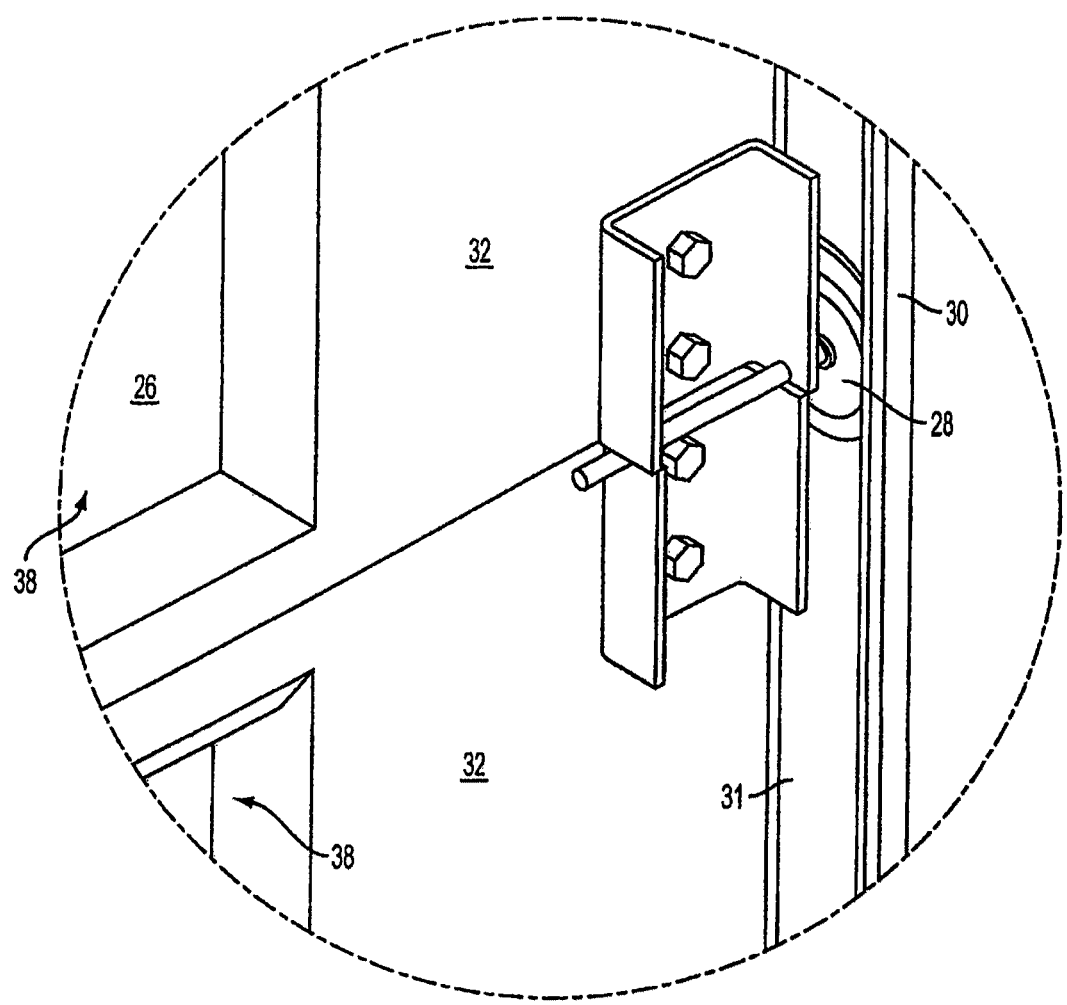
FIG. 6 shows a close-up perspective view of an interior portion of the garage door of FIG. 5, including a roller connected to a guide rail.
Figure 7:
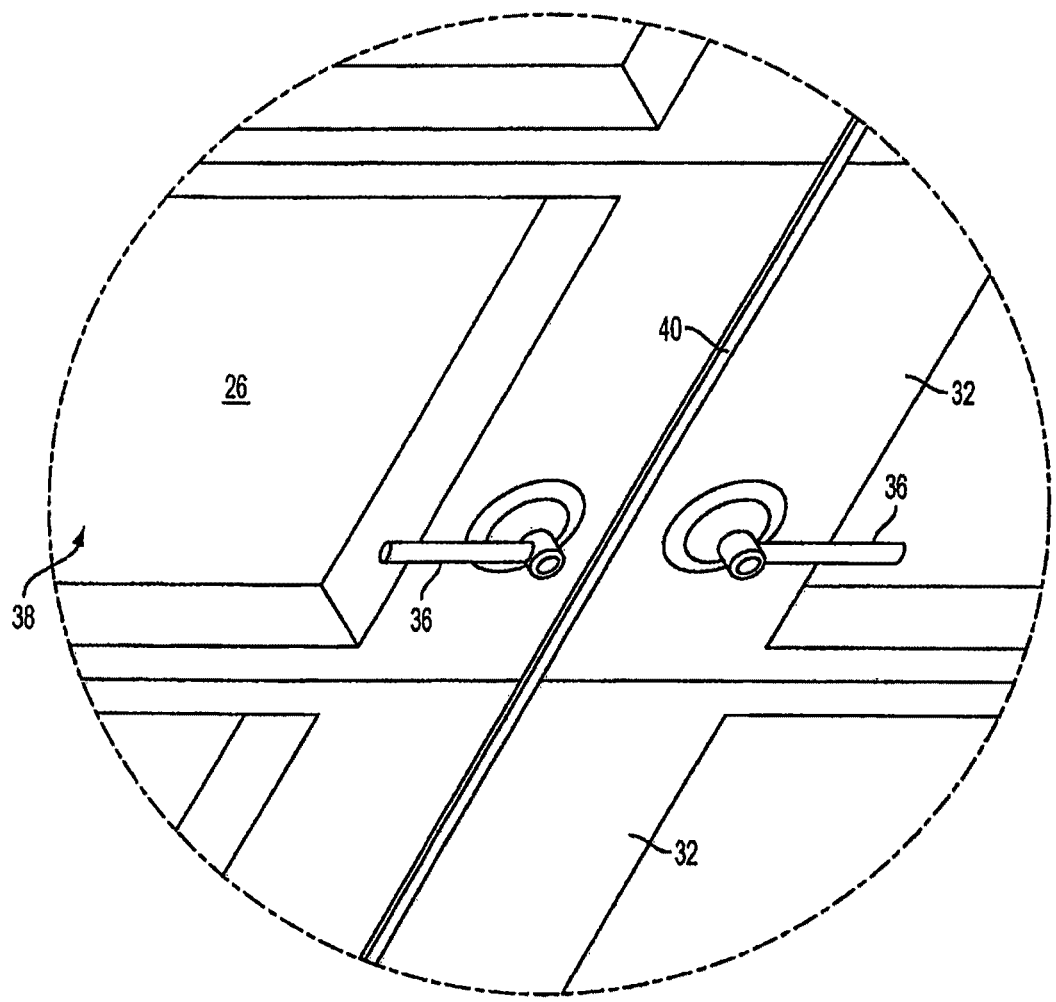
FIG. 7 shows a close-up perspective view of an exterior portion of the garage door of FIG. 4, including a vertical groove and door handles.

The arrays 24 of light-transmitting panels 26 shown in FIGS. 1 and 3-5 each include five rows by three columns, which generally match the appearance of regular French doors. The arrays 24 are spaced from one another along the door 22 to give the appearance of four separate passage doors. To enhance the appearance of separate doors, the overhead garage door 10 further includes door handles 36. Each array 24 in combination with a corresponding handle 36 generally forms a façade element 12 to simulate a light-transmitting door. Although the door handles 36 do not function to open the simulated doors 24, they may act as functional latches for opening the garage door 10 or as handles for lifting the garage door 10. To further simulate the appearance of French doors, each one of the light-transmitting panels 26 appear to be glazed in a section 32 as shown in FIGS. 6 and 7, which is similar to the manner in which glass is often glazed in window frames. Accordingly, simulated beveled moldings 38 are provided in the sections 32 for retaining the light-transmitting panels 26. The panels 26 retained therein are able to transmit light from the outside environment into the interior of the garage 14.

Further, the door arrays 24 may include a mix of different panel types, and may include opaque panels. Thus, the quantity of light transmitted into and out of the garage 14 can be custom tailored according to the light transmissibility of each one of the panels 26.

To enhance the effect of the façade elements 12 in simulating French doors, the door 22 also includes three printed vertical grooves 40. Each groove 40 is disposed between a pair of panel arrays 24 to simulate the jambs of a set of adjacent doors. The grooves 40 additionally emphasize the appearance of simulated doors by drawing the eye away from the horizontal lines 42 created by the junction of adjacent sections 32. The grooves 40 are accentuated in comparison with the horizontal lines 42 by being much wider and deeper than the horizontal lines. Providing the grooves in a dark color further increases their visual effect.

In one construction, a method is provided of printing on a wood grain section or a smooth section could create a section of a carriage house door. The print method may be applied to include personal logos such as team logos (e.g., Notre Dame® or Redskins®) and/or provide a three-dimensional illusion, such as the look of a corvette automobile parked in the garage, or in one other example, an animal, such as a puppy, looking out of a window pane. These methods can simplify sectional garage door manufacturing and provide great flexibility in designing doors.

To provide a better understanding of the inventive door forming system, one construction is described in more detail below. Referring to FIGS. 8-17 door forming system 100 includes a coil feeding apparatus 200 for transporting a door segment 300 to an assembly station 500. The coil feeding apparatus 200 is provided upstream of the assembly section 500 for insulating foam. As shown in FIG. 11, feeding apparatus 200 comprises sheet coils 202 of metal (such as steel) that form the door skin. In one construction, the door skin could be provided in precut lengths, if desired. For ease of explanation, the terms "door feed side" refers to the side from where the door segments convey for production to enter into a system component/station. Likewise, the terms "door exit side" refers to where the door segments exit from the system component/station and can be conveyed for other actions or manufacturing activities.

Figure 10:
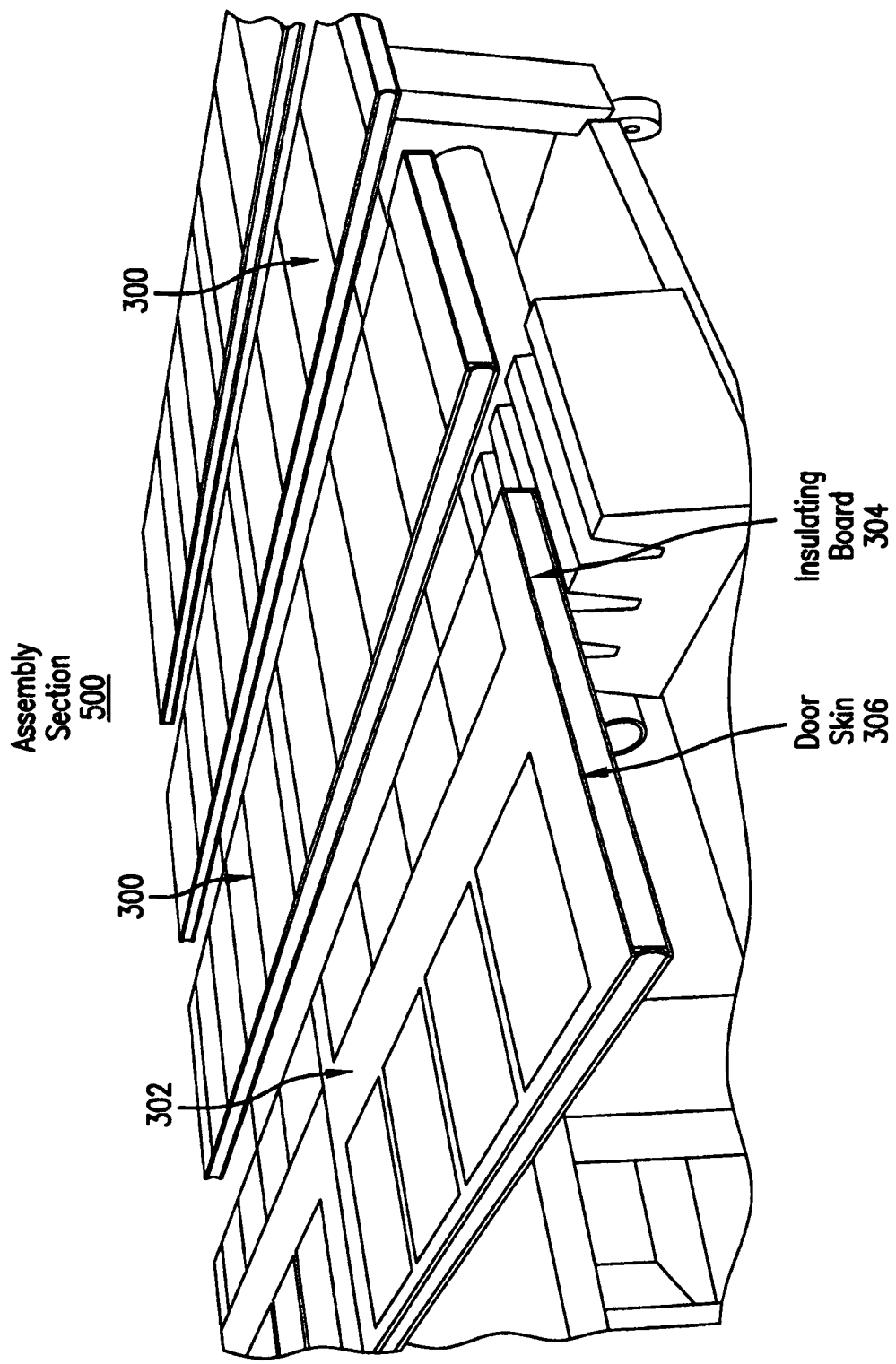
FIG. 10 is a diagram of an assembly station with door segments thereon.
Figure 11:
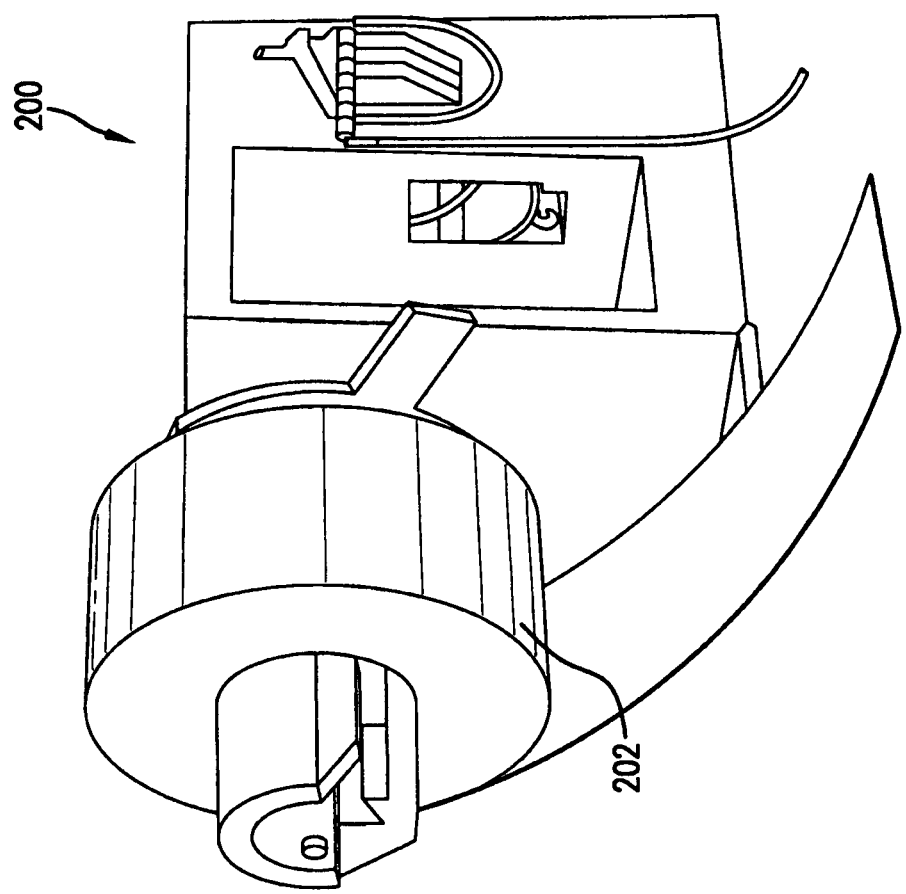
FIG. 11 is a schematic diagram of a coil feeding apparatus.
Figure 16:
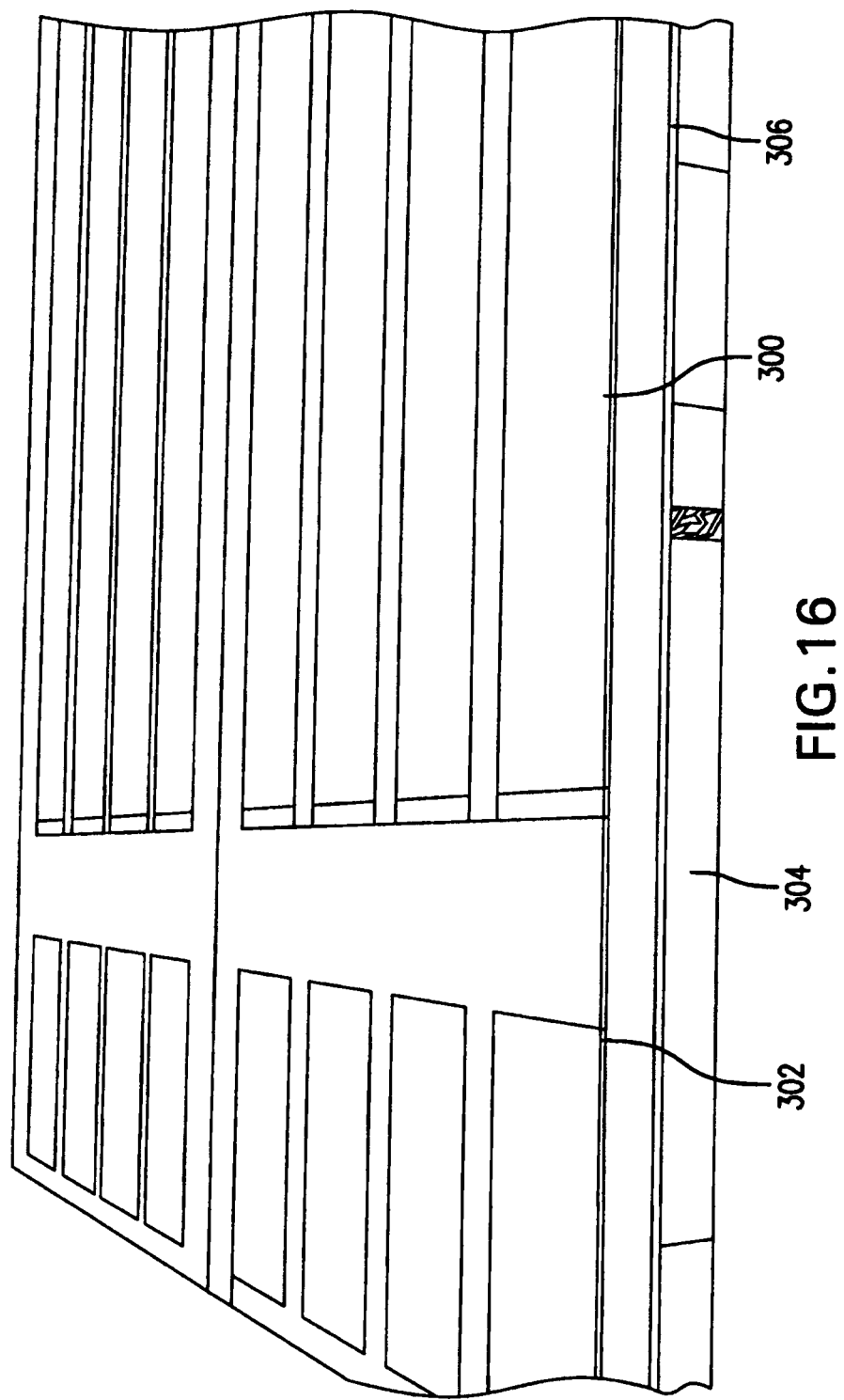
FIG. 16 is a schematic representation of a door segment construction.

Referring to FIGS. 10 and 16, at the assembly section 500, an insulating board or insulating component 304 is positioned on a surface of a door skin 306. The material for the insulation component maybe a foam or other material having a sufficient R-value to reduce heat transfer. Adhesive material may be applied to the door skin 306 (or the insulating board 304) to affix the board and door skin together to define a composite door section.

Figure 9:
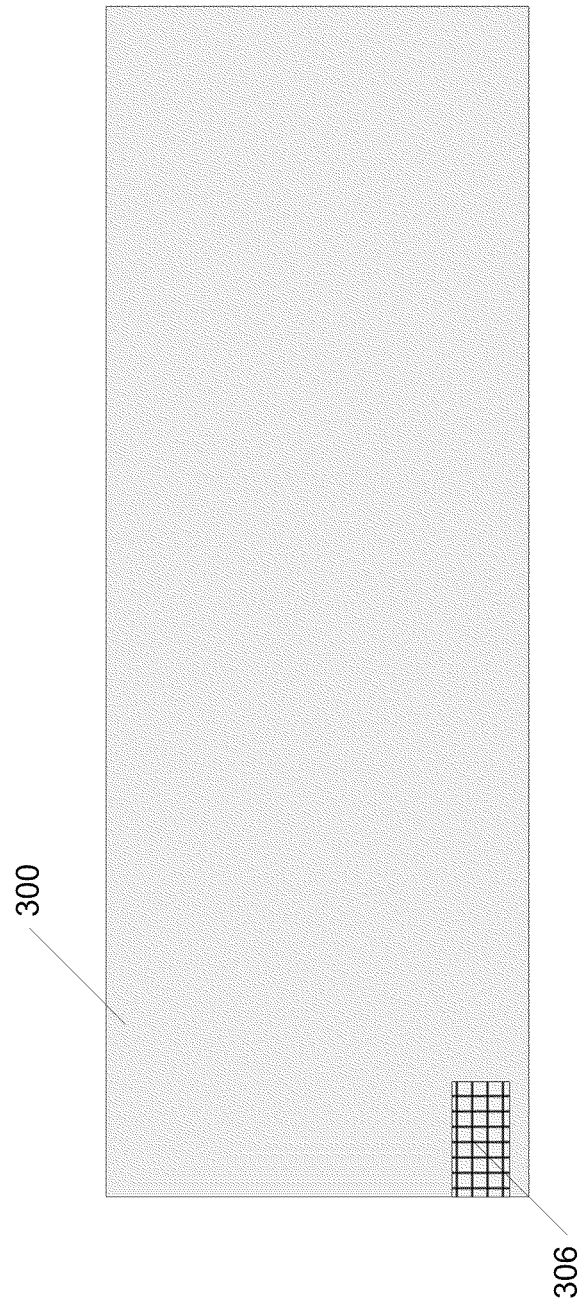
FIG. 9 is a schematic diagram of a garage door according to an embodiment of the invention.

An image printing section 600 applies a plurality of ink to the composite door section to form an image or a portion of a larger image in an assembled configuration of a garage door. In one construction, the door section 300 has a unique identifier/code 306 that enables the image printing section 600 to select or link to a specific image for printing of the section. In such a way, a composite garage door section may have an image or image portion electronically "tagged" to each section. This feature enables automatic operation of the printing process for each door section. As shown in FIG. 9, one implementation would be with Radio Frequency Identification (RFID) labels/chips 306 or bar coding on each door section which is electronically linked to a selected image that is physically printed thereon. In operation, the door section ID is read by an electronic reader (e.g., wirelessly via a radio frequency) and then the door section would be fed to the digital ink printer for printing the electronically linked image thereon, such as a French door or carriage house door appearance. Several implementations can be employed, including High frequency RFID systems (850 MHz to 950 MHz and 2.4 GHz to 2.5 GHz). In one construction, the RFID tag would be a passive type. RFID tag with the unique code may be physically applied to the door skin and the code can be used to identify the particular door selection for a specific image to be printed on the garage door section. Additionally, RFID tag, with the unique code feature, can be applied to the door skin so that a type insulating materials may be identified for the door during the manufacturing process.

Figure 8:
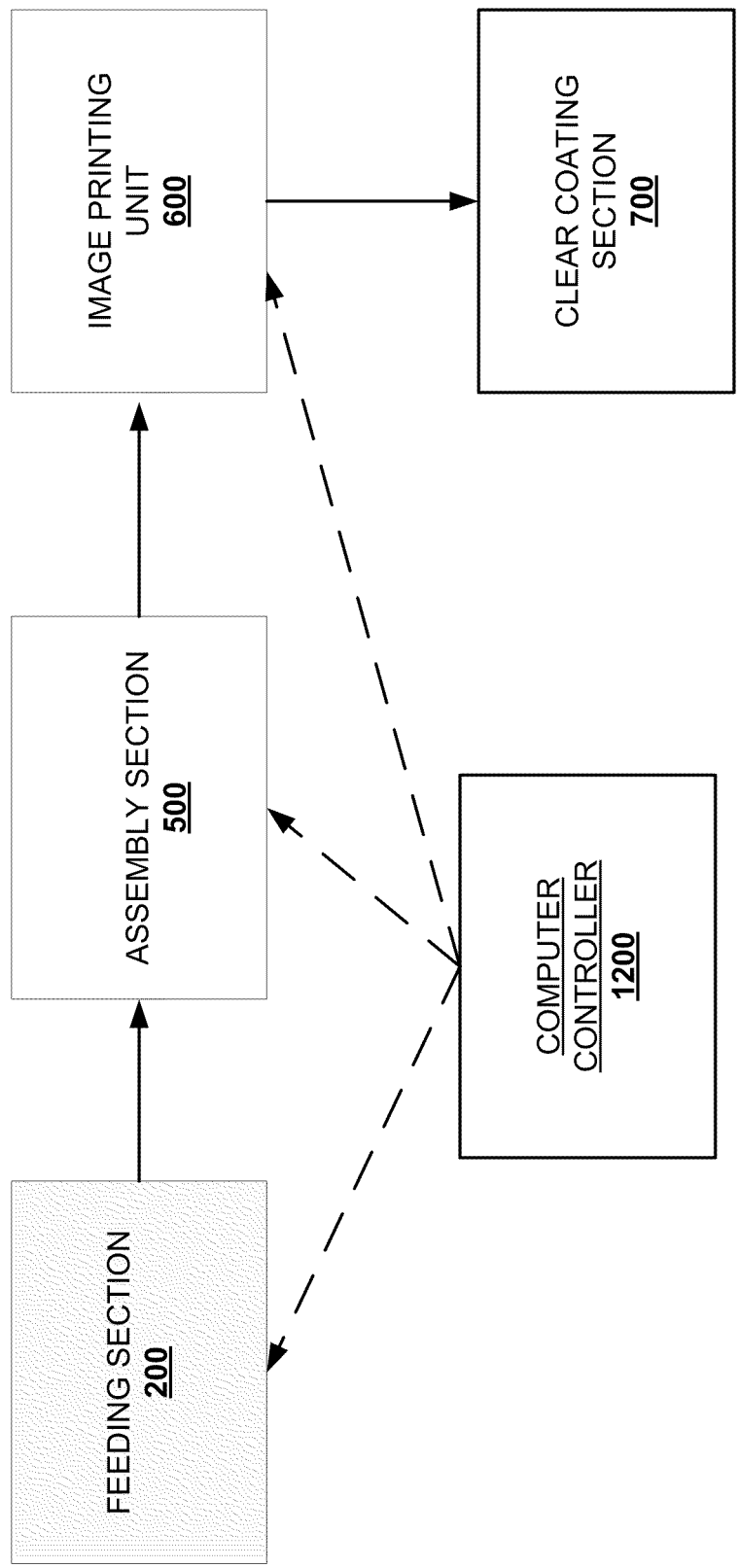
FIG. 8 is a schematic plan view of a system for forming garage doors according to an embodiment of the invention.
Figure 14:
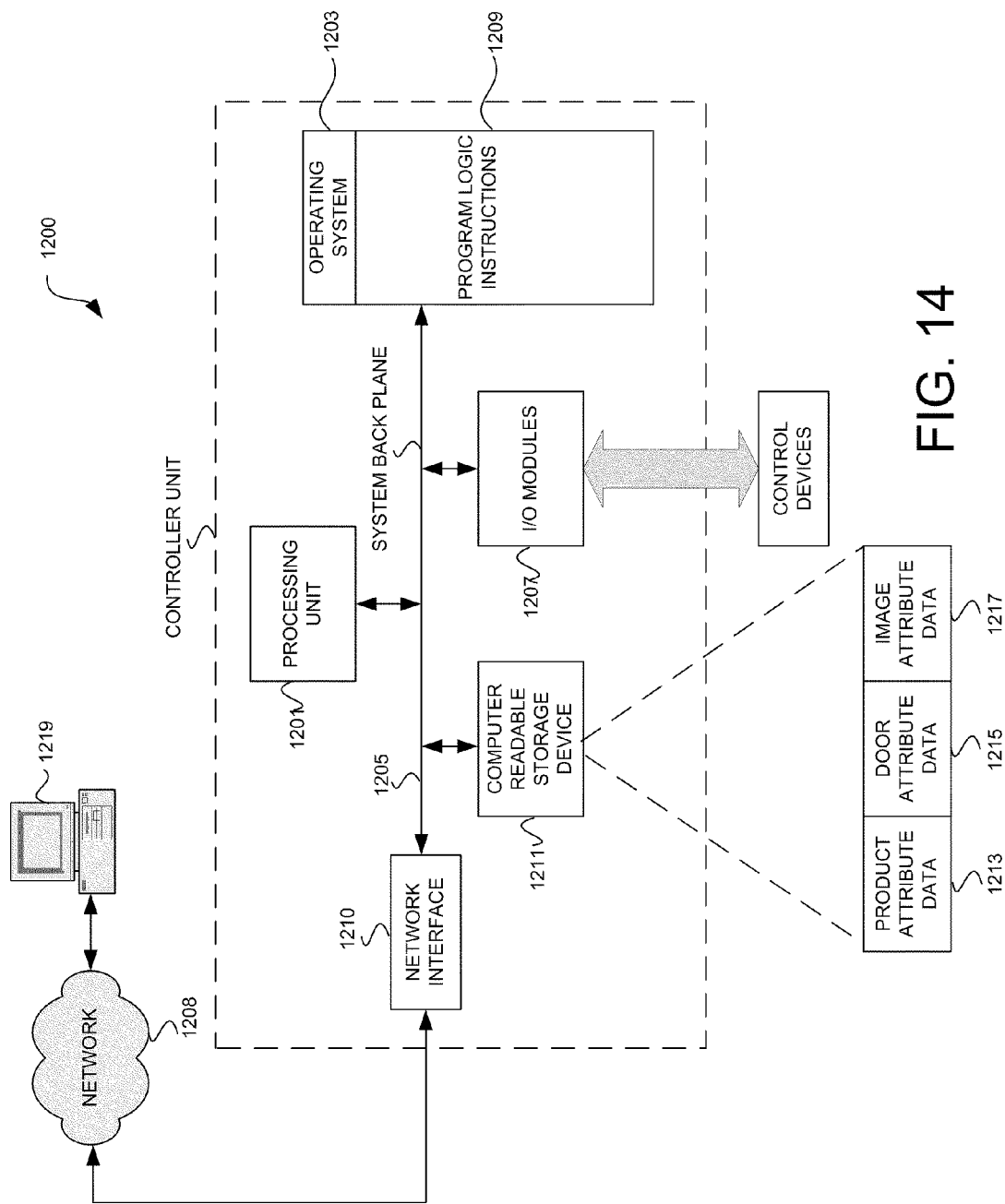
FIG. 14 is a schematic diagram of an embodiment of a controller unit of the system of FIG. 1.

Referring to FIGS. 8 and 10, in one construction, door forming system 100 operates in a semi-automated manner controlled by a microprocessor controller unit 1200 operatively connected to several control circuits and control devices (FIG. 14). Each production component may be capable of holding a door, in queue, if there is a slow up downstream. In one embodiment, controller unit 1200 has selective mode control to enable customization for placing an image or multi-image segments for a garage door to be produced with forming system 100.

In one construction, the image printing section 600 may be provided in the form of an Inkjet printer. An example ink jet printer is a commercially available as Inca Columbia turbo. The print technology used by this printer is piezo-electric drop-on-demand inkjet type. The format of this machine is typically about 126 inches by 63 inches. The substrate thickness for the printer can be 1.58 inches thick or less and the weight can be 88 pounds or less. The raster in process (RIP) software for use with the printer could be a Wasatch version 5.1.1 and the print head technology on a printer can provide accurate dot placement for high resolution prints. In one construction, a printer may have 96 print heads in four color configuration. The machine can produce 24 full beds per hour (allowing for handling time). In one construction, a printer with variable sprint speeds up to 1,700 square feet per hour can be used to print images. Nevertheless, other print speeds are possible. Other example, commercially available machines include, printers known as the Spider and the Viewtech models 200 and 600.

An example ink that can be used is called UVIJET®. The ink is commercially available from Fujifilm Sericol. Advantageously, Uvijet inks dry quickly when activated with Ultraviolet light radiation so they remain stable in the print head. The ink dries fast enough to keep up with speed of the printer. This Ink provides superior adhesion and flexibility. Using the micro-V dispersion technology, Uvijet inks can provide vibrant, durable colors using automotive grade pigments with a high light-fastness rating to ensure the prints are very durable. This ink is versatile and can print on almost any type of sheet from paper to sheet steel. This ink is durable outdoors and can last for at least two (2) years without a protective coating. Nevertheless, other ink formulations may be used.

Figure 12:
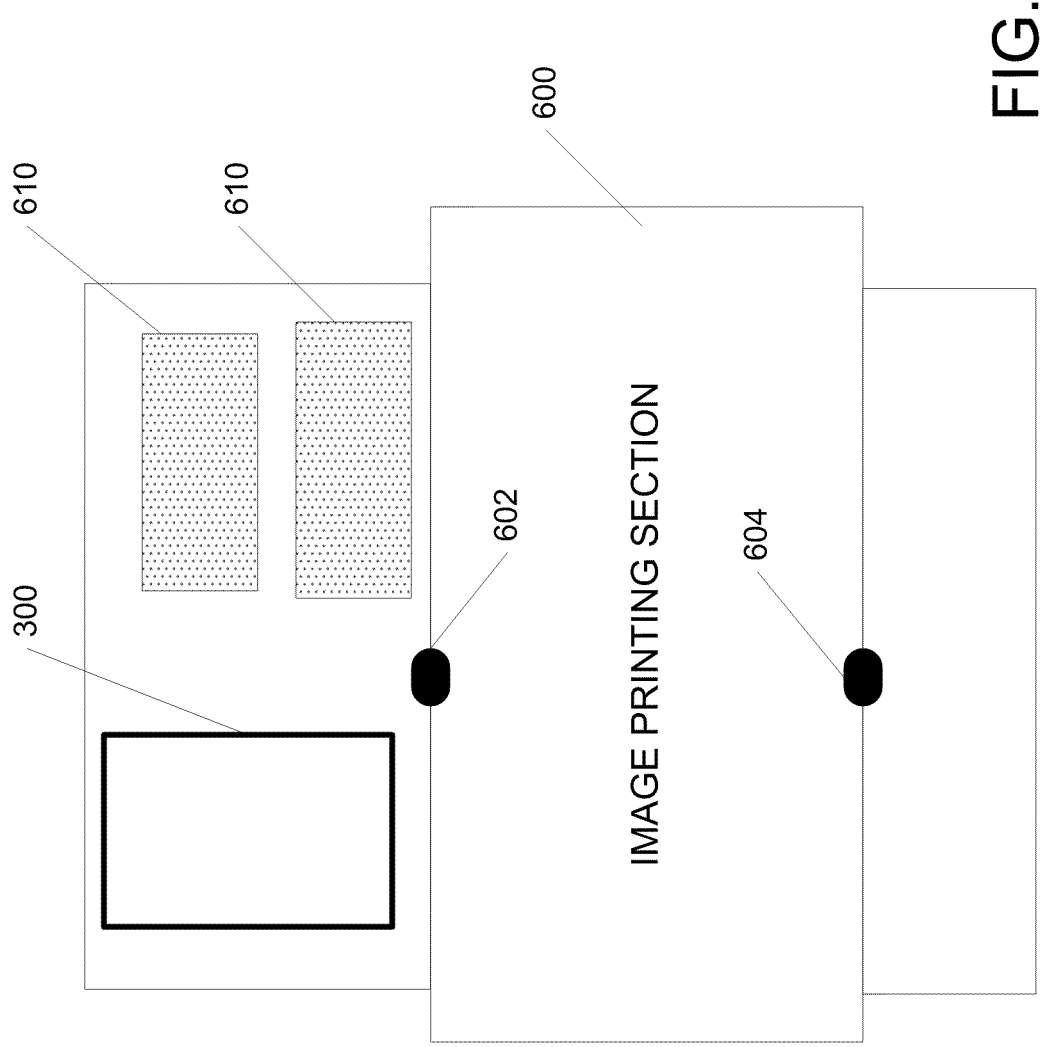
FIG. 12 is a schematic diagram of an image printing section.

With continued reference to FIG. 12, printing section 600 may further include inlet and outlet door sensors 602, 604 for enabling controlled advancement of the door into the printing section 600. In particular, door sensors 602, 604 sense the leading and trailing edges of the door segment. In one arrangement, sensors 602, 604 are optical that direct a beam of light downward or upward to detect when a door edge passes through the light. In operation, inlet sensor 602 can be configured to sense the door leading edge and also preferably the trailing edge as a door is conveyed (e.g. via an endless belt or rollers) from assembly section 500 to the printing section 600. The detection of the door leading edge indicates or otherwise signals controller unit 1200 that the door has arrived in the printing section 600. After printing, outlet door sensor 604 detects the trailing edge of the door and signals the controller unit that the printing section 600 is ready to receive additional doors.

In one construction, door sensors 602, 604 may be a photoelectric sensor that detects an object. Nevertheless, other types of sensing devices may be used, such as contact sensors, capacitive sensors, or limit switches. A capacitive sensor can sense the trailing edge of the door by sensing a change in capacitance from the door when the trailing edge advances by the detector. Door position sensors 602, 604 are operatively coupled to microprocessor controller unit 1200 by interface control hardware, such as wires or wireless connections. This likewise enables controller unit 1200 to receive and process a detection signal generated by door sensors 602, 604. In these ways, the active control reduces production errors without relying on conventional timing patterns. The sequential detection of the leading edge and trailing edge enables different length doors to be used without adjustment for timing. In addition, a door will be appropriately sensed to start the printing operation.

As seen in FIG. 12, image printing section 600 may include selective independent negative pressure regions 610 configured to hold down the bottom surface of the door segment during a printing operation. The regions are located at regular spaced predetermined locations on the printer bed. The spacing and selective control provides for flattening and securely holding warped doors, in each region against the bed surface. In one construction, a flat, smooth or firm undersurface of the door section can allow it to be secured effectively and easily via suction created by air apertures throughout the flatbed of the printer. The flatbed machine surface can have tiny apertures formed across a retention region for securing the section by drawing air in through the apertures to create negative pressure or suction against the undersurface of the door segment. In one construction, a majority of the flatbed surface in contact with the undersurface area of the section would have the tiny suction apertures formed therein, and more preferably, all or almost the entire flatbed surface in contact with the undersurface area would include these apertures and create retention or suction force during printing.

As discussed previously, retention regions/portions of the field(s) of tiny retention apertures in the flatbed machine surface could be selectively deactivated when not needed, such as when small sections are being printed on or when fewer sections than possible are being processed. The portions of the fields could be deactivated, for instance, by covering or plugging the tiny apertures with a sheet material, such as paper or tape. In another example, a valving device could control which portions of the field(s) of tiny retention apertures were active at a particular time controlled by computer controller 1200. Selectively deactivating unused portions of the field(s) can improve the strength of the suction retention force and in turn hold the segments in their desired place more effectively during processing and be less vulnerable to movement. A high retention suction force (e.g. vacuum or negative pressure) being applied against the door segment during printing and related processing can avoid movement during the printing process to enable a high quality image to be printed on the surface of the garage door segment. Nevertheless, other methods of creating of retention force are possible.

Customization Features

Figure 13:
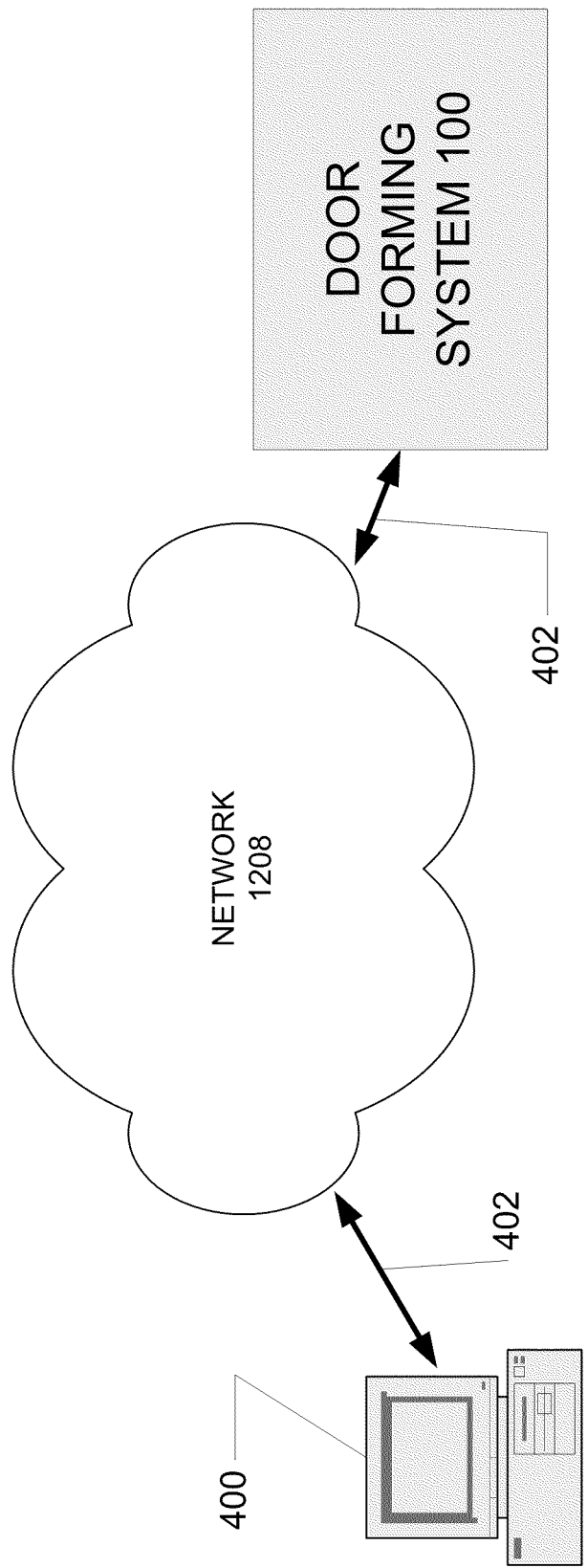
FIG. 13 is a schematic diagram of an image transmission network.

Referring to FIG. 13, the user may be select a plurality of digital images from a preselected database of images or the images maybe transmitted to a computer 400 via the internet or any suitable telecommunications network 1208. It will be appreciated that the network connections 402 shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

The image design can be created with a Photoshop software or another technique on a computer either with digital drawings or a picture of a section or a combination of both. In further aspects, computer-readable media provide nonvolatile storage of computer readable instructions embodying at least one or more image sets. The images set may be provided in subject area classifications, such as professional and amateur sports, entertainment, music, motion picture, business, print and electronic media, or politics. In such a case, a gallery or listing of images may be provided for each package or provided on a networked computer or web server logically connected to the system 100. For example, a computer-readable medium may have several encoded digital images of various types of garage doors styles.

This feature provides flexibility and can allow for a wide variety of images, colors, dimensions, and the like. Desirable images can include carriage house door sections and FRENCHPORTE® garage door section. Such methods can provide garage doors having an appearance similar to what the garage door industry is currently making in a much simpler, less expensive way that can be environmentally friendly, such as by eliminating the use of wood. Garage doors made according to methods described herein can be more appealing garage doors than conventional doors provided for an affordable price to the consumer and builder.

Controller

Referring to FIG. 14, microprocessor controller unit 1200 comprises a computing device for controlling system 100. In one construction, controller unit 1200 comprises a central programmable logic control unit (PLC) or a series of independent central programmable logic control units configured for providing semi-automatic or automatic processing operation. Likewise, controller unit 1200 may be a general purpose computer configured to operate with such programmable controllers. Nevertheless, those having ordinary skill in the art can readily program the operational logic sequences for forming system 1.

As shown schematically in FIG. 14, in one construction, controller unit 1200 comprises a SLC 500 series programmable controller including 1746 series digital and analog input/output modules commercially available through the Allen-Bradley Company of Milwaukee, Wis., a division of Rockwell International; however, other suitable equipment or devices may be used for the controller unit. For example, the computer maybe a general purpose computer programmed to execute digital data. Hardware components of microprocessor controller unit 1200 may include a processing unit 1201, a system memory 1203, and a system backplane 1205 that forms a data pathway for input/output modules 1207. Input/output modules 1207 interface with various control devices, such as the sensing devices and control valves comprising system 100. Processing unit 1201 may be a suitable microprocessor used in industrial control systems. System backplane 1205 may be any of several types of conventional backplane structures. System memory 1203 includes computer readable code in the form of read only memory (ROM) and random access memory (RAM). System memory 1203 stores programmable instructions of the operational logic sequences 1209 that are executed by processing unit 1201.

Controller unit 1200 may further include a computer readable storage device 1211 that may comprise an Eraseable Programmable Read Only Memory (EPROM), Electrically Eraseable Programmable Read Only Memory (EEPROM), or battery backed-up RAM. Storage device 1211 and associated computer-readable media provide nonvolatile storage of computer readable code and operational logic sequences 1209. In a further arrangement, controller unit 1200 may operate in a networked environment 1208 using a network interface 1210. The networked environment may include a local area network (LAN) any number of networking signaling used in conventional industrial control systems, such as Ethernet, Controlnet, Devicenet, Datahighway plus, and WiFi.

Advantageously, forming system 100 may be configured with an operative connection to an internet protocol (IP) network 1208 which enables access for devices on the World Wide Web to provide provisioning and other features. In one arrangement, production data, such as the number of units produced, and type of garage door sections may be viewed from a remote location using a computer terminal 1219 running a conventional web browser. In this manner, a production manager is enabled to receive production information via an internet connection and perform electronic commerce transactions.

With continued reference to FIG. 14, according to an embodiment, storage device 1211 includes a plurality of product attribute data 1213 linked for selective mode control of forming system 100. Product attribute data 1213 may include garage door attribute data 1215, which indicates that a door will be manufactured on forming system 100. Furthermore, the door attribute data 1215 includes the identification of the door segment logically linked to the RFID tag and unique code (See FIG. 9). The attribute data provides mode control to cause microprocessor controller unit 1200 to execute commands of engaging and disengaging components of forming system 100, for example engaging the image printing section 600. Image attribute data 1217 includes an electronic signature or link of the digital image associated with the particular door segment (e.g., image filename or file location and filename). Hence, the identification of the door segment is uniquely linked to the image to the printed thereon by way of the attribute data.

The following examples are set forth as representative of the aspects of the door forming system 100. The example actions for printing on a garage door section with a flatbed printer are not to be construed as limiting the scope of the invention as these and other equivalent embodiments will be apparent in view of the present disclosure.

In an example configuration, image printing section 600 may be provided in the form of a printer that could have between 64 and 96 print heads that can be adjusted to get as close to the door skin sheet material as possible. These print heads can spray ink on the material. The configuration could have a desirable print head gap or gap range to provide a high quality image. For example, the closer the print head is to the material for a particular printing machine configuration could mean the better the quality is of the image. In an example configuration, the print heads could start printing lightly on a first inch and a half wide region of the surface, then go to a second inch and a half wide region, such as an adjacent region, and then return back to first region. Each region could be sprayed multiple times to provide a high quality print. For example, the printing heads could end up spraying each area they hit about ten times going back and forth. The images being printed could start out light and after a final spray, such as the tenth spray, they could be dark and durable to provide a high quality image.

In one example, disposed to the print heads there are located UV lamps that can dry the ink almost as soon as it hits the surface of the material. This feature can help prevent the ink from soaking into the material serving as a printing material. Referring to FIG. 8, if desired, near or at the end of printing actions and before boxing and shipping, one or more layers of protective coating are applied over the print on the section. In the clear coating section 700, the protective coating is a rolled or sprayed clear coat of paint or other protective substance applied over the painted steel or metal and the ink, which can give the section added protection from the weather elements and outdoor environments. The thickness of the coating can be in a range from 1.0 to 2.5 mils applied on the door section. In one example of a clear coating material, polyurethane material, such as commercially available from the Valspar Corporation sold under in the trade as VALTHANE 730. Nevertheless, the coating can be a two part mixed formulation. If desired, after coating the door can be placed in a large oven type apparatus to assist in the drying and curing process. If desired, the coating could be a semi-gloss type or high-gloss type of finish.

Figure 17:
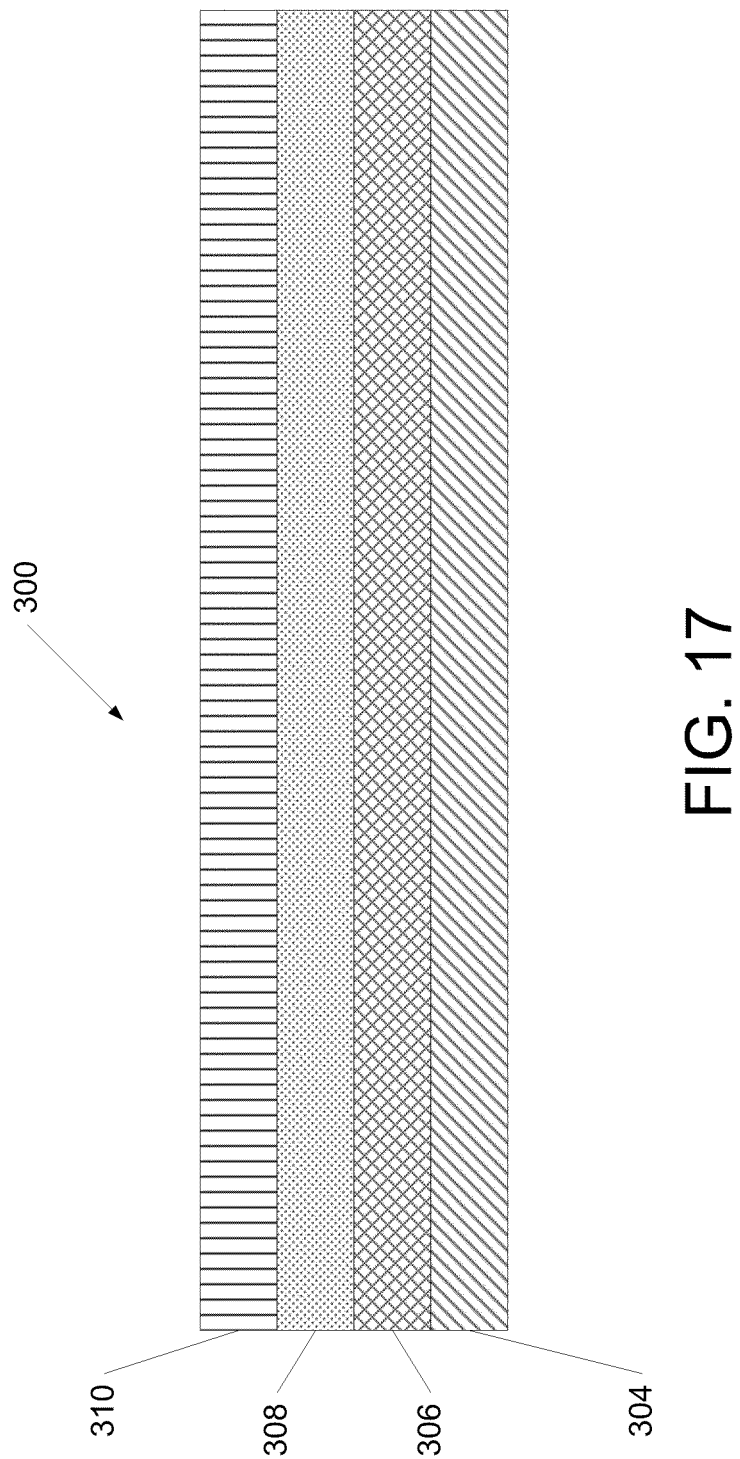
FIG. 17 is a schematic representation of a section view of a door segment construction.

As best seen in FIG. 17, a schematic section of finished door section 300 is shown. The lowest layer 304 is the insulating foam. The door skin 306 is disposed on top of the insulating layer. The door skin 306 may be a layer of primer paint in some construction of the door. This primer paint may be a polyester based formulation. Nevertheless other formulations may be used for the primer layer 304. An ink surface or layer 308 is provided on the door skin. Finally, a clear coat layer 310 is provided or disposed on top of the ink layer 308. It should be noted that one or more layers of the materials may be used on a door section 300.

In one method, the process starts from a first image, divides the first image into a number of parallel sections to form multiple section images. After the image design is created or selected by the user, it can be transferred or otherwise electronically transmitted to a special purpose or general purpose computer programmed to operate with the image printing section 600, such as the computer on an Inca Turbo® flatbed printer. The computer is called a RIP computer (Raster in Process). This computer sets the design to work with the printing machine specific. The printer uses small drop print heads which creates smoother color transitions which minimize the graininess of light colors and produce smooth skin tones. This printer can give a three dimensional look to illustrated window panes creating the illusion of a indentation in a FRENCHPORTE® garage door section through the printing process of multiple layers which can easily be used to vary opacity. Nevertheless, controller 1200 may be logically connected to the image printing section 600 to receive the desired image for printing.

The following are example methods, actions and/or processes pertaining to printing door sections of various configurations: When the individual sections are made in the garage door factory assembly there are a few steps that can be done before the door section is conveyed to the printer.

In one example construction, a steel coil used to make door sections is painted with industry standard paint, such as the paint steel companies use now that has been tested to withstand the elements in an outside environment. The paint used in the process preferably adheres well to ink for use in digital printing.

The painted metal (e.g., steel in one construction) can be smooth or it can have a textured looking surface, such as a simulated wood grain surface. An acrylic look and texture can hide imperfections in the section. If desired, a smooth surface can be wiped down with a cleaner, such as Formula 409, to make sure it is clean before going on the printing section.

The conventional step of adding end caps to a section can be omitted if desired. End caps are brackets that are put on the ends of sections to give them a finished look, but they may not be needed and may detract from the look of the printed door. Omitting end caps can ensure the section has a smooth flat surface when laid down on a printing section (e.g. flatbed printer). End caps might be put on the section after the printing, if desired. In one construction, the thickness of the door segment would be one and three eights inches thick or less to avoid causing clearance problems with many printers and to provide a high quality print.

If desired, the door segment includes insulation installed prior to printing, because it can make the section more firm as it proceeds through the flatbed printer. A frame can also be used to add rigidity to the section during printing and/or other processing, which may be desirable for non-insulated sections. Such a frame can be made out of metal, rubber, foam or another rigid material. A section-sized brick or block of insulation can be used as a frame for non-insulated sections, which could be added prior to or during the printing process and then be taken out.

Figure 15:
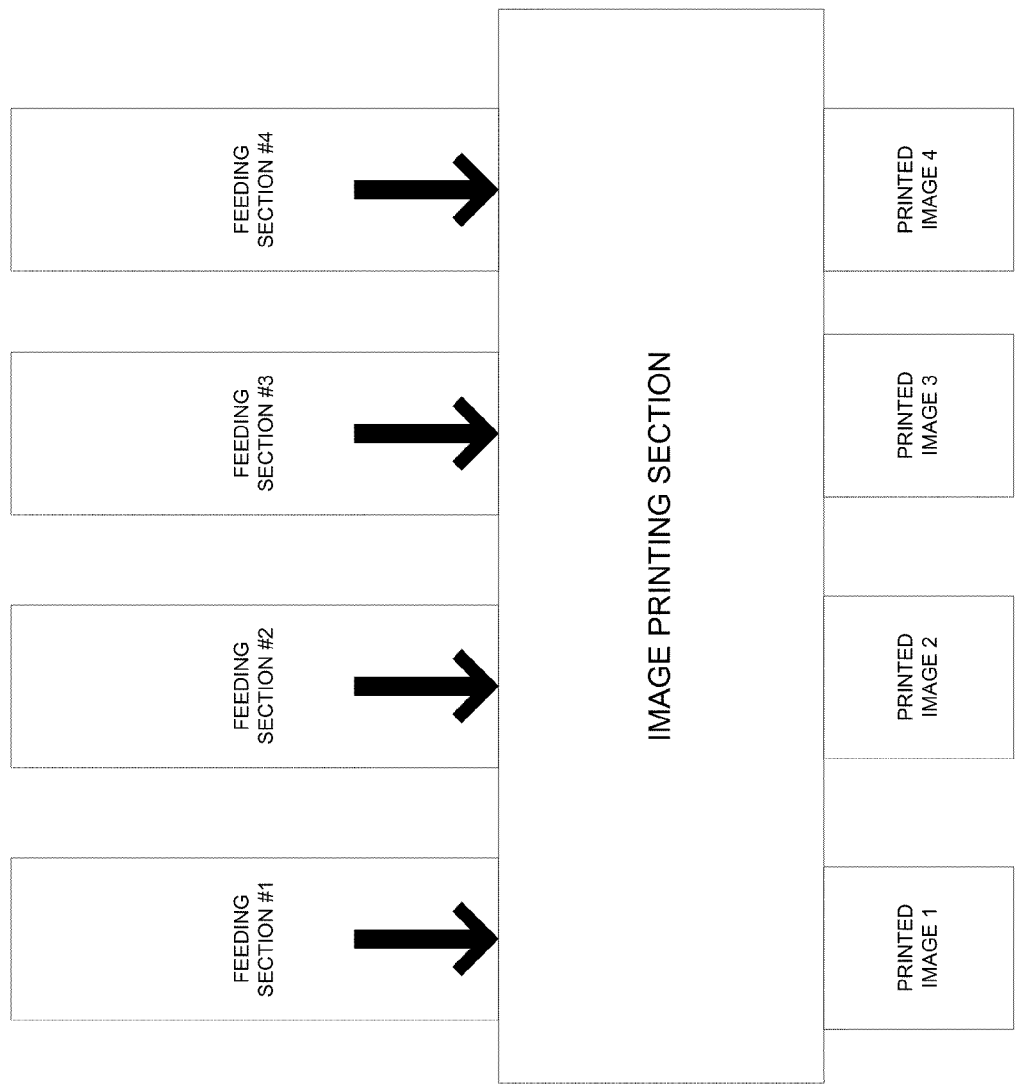
FIG. 15 is a schematic diagram of an alternative embodiment of a forming system.

Referring to FIG. 15, in an alternative construction, door forming system 101 may include the sections of system 100. In this construction, a plurality of a coil feeding apparatus 202 is provided to feed in an image printing section. Feeding apparatus 202 comprises sheet coils of metal that form the door skin. Apparatus 202 includes a steel coil used to make door sections painted with industry standard paint. The paint used in the process preferably adheres well to ink for use in digital printing. In FIG. 15, four coiling feeding apparatus 202 can run simultaneously into the printing section. In this way, the time to manufacture a garage door will be greatly reduced. Nevertheless, the there could be more the four feeding apparatus or less than four feeding apparatus depending on the production configuration.

In this example, Feeding Apparatus #1 may be provided to the image for the top part of a garage door (e.g., image 1). Feeding Apparatus #2 may be provided to the image for the intermediate part of a garage door (e.g., image 2). Feeding Apparatus #3 may be provided to have the image for a lower part of a garage door. (e.g., image 3) Feeding Apparatus #4 may have the image for the lowest part of a garage door. Once the length of the end-product door is known, the sheet of metal can be cut to the desired length and assembled with insulation foam and end caps. Furthermore, clear coating can be performed after the printing operation.

Systems and methods for forming a door and door sections have been described. One or more flatbed printers or other style printers, depending on the desired preferences for making different size sections (e.g., various sized double doors and/or single garage doors), could be put in an assembly line. Nevertheless, the printers could also be located in one or more separate areas. The door sections could go through a clear coating process as part of the processing, such as after printing, to provide added protection against the elements.

These innovative actions are believed to provide great cost savings as well. As an example, assume ink costs about ten cents a square foot. Putting thousands of sections through one or more printing machines per week according to such a method could pay for the printing machine(s) in a short period of time. Garage doors manufactured according to various process desired herein could easily compete in the marketplace with the doors that the industry currently makes and the dealers buy. In one construction, the methods herein provide for beautiful looking and inexpensive door of consistent provide quality.

System 100 has a modular configuration in which the components can be configured to adapt to different plant layouts. All U.S. patents referred to in this application are fully incorporated by reference for all purposes. While the present invention has been described with reference to exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

What is claimed is:

1. A method of manufacturing a door having multiple door sections, comprising the steps of:
   electronically receiving data representative of a first digital image in a computer readable medium;
   dividing the first digital image into a number of parallel segments to form multiple segment images;
   printing with one or more successive layers of ink, each of the multiple segment images on a surface of each corresponding door section respectively;
   directing UV light on each successively printed layer for drying each said layer immediately after printing with sufficient rapidity to allow immediate over-coating or overprinting of each said layer;
   over-coating each printed segment image with a protective coating;
   securing at least one of said door sections having a warped portion to a support surface with sufficient vacuum to flatten said warped portion of said door section against said support surface such that the surface to be printed is uniformly spaced from the support surface to thereby prevent distortion of the segment image; and
   grouping the door sections so as to create when assembled a door having an appearance of the first digital image.

2. The method of manufacturing a door according to claim 1, further including a step of receiving the first digital image prior to the step of dividing said image.

3. The method of manufacturing a door according to claim 1, wherein the first digital image comprises the appearance of at least one of French door or a carriage house door.

4. The method of manufacturing a door according to claim 1, wherein the metal comprises steel.

5. The method of manufacturing a door according to claim 1, comprising: wirelessly detecting data representative of a door segment via radio frequency, and selecting an image to be printed on the door section in response to said data.

6. The method of manufacturing a door according to claim 1, including a step of detecting a leading edge of the door section.

7. The method of manufacturing a door according to claim 1; including a step of detecting a trailing edge of the door section.

8. The method of manufacturing a door according to claim 1, including a step of actuating a plurality of independently controlled negative pressure regions which hold a bottom surface of the door section against a work platform.

9. The method of manufacturing a door according to claim 1, including a step of receiving a radio frequency identification of the door section and printing an image on the door section in response to said radio frequency identification.

10. A method of manufacturing a door, comprising the steps of:
    electronically receiving data representative of a selection of a first digital image;
    dividing the first digital image into a number of parallel segments to form multiple segment images;
    printing each of the segment images with ink on a surface of each of a plurality of metal door sections corresponding to said parallel segments;
    applying negative pressure on at least one the door section having a warped portion, said negative pressure sufficient to secure and hold said warped portion of the section flat on a support during printing such that the surface of the door section to be printed is uniformly spaced from the support; and
    grouping the door sections so as to create, when assembled, a door having an appearance of the first digital image.

11. The method of claim 1, including the further step of:
    prior to printing, providing a rigid support frame that supports said door section printing.

12. The method of claim 11, wherein said door section is a non-insulated section and said rigid support frame is a block of insulation that is added prior to said printing step and then removed.

13. The method of claim 10, including the further step of:
    prior to printing, providing a rigid support frame that supports said door section during printing.

14. The method of claim 13, wherein said door section is a non-insulated section and said rigid support frame is a block of insulation that is added prior to said printing step and then removed.

15. The method of claim 1, wherein at least one said parallel image segment comprises an image illustrating a window pane and the illusion of an indentation of said window pane is created by printing multiple layers to vary the opacity of an image area of said window pane.

16. The method of claim 10, wherein at least one said parallel image segment comprises an image illustrating a window pane and the illusion of an indentation of said window pane is created by printing multiple layers to vary the opacity of an image area of said window pane.

17. The method of claim 1, wherein the step of printing on at least one door section is performed without an end cap installed on said door section, whereby the section surface remains flat for printing.

18. The method of claim 10, wherein the step of printing on at least one door section is performed without an end cap installed on said door section, whereby the section surface remains flat for printing.

* * * * *